Patented Apr. 3, 1945

2,373,011

UNITED STATES PATENT OFFICE 2,373,011

PRODUCTION OF MALONIC ACID

Edgar C. Britton and Ezra Monroe, Midland, Mich., assignors to The Dow Chemical Company, Midland, Mich., a corporation of Michigan No Drawing. Application September 22, 1942, Serial No. 459,288

5 Claims. (Cl. 260—537)

This invention concerns an improved method for the production of malonic acid.

Although satisfactory methods for the production of malonic acid di-esters, e. g., diethyl malonate, of high purity are known, the methods heretofore employed for the preparation of malonic acid itself are not well suited to commercial practice. For instance, it is known that malonic acid may be prepared by hydrolyzing an alpha-cyano-acetate and that the malonic acid product may be separated from the hydrolysis mixture either by extraction with an organic solvent or by precipitating the same as calcium malonate, separating the latter and acidifying with a mineral acid to recover the malonic acid in free form. However, malonic acid prepared in these ways is usually far from pure and is not readily purified. Pure malonic acid has heretofore been prepared from a malonic acid di-ester by heating the latter at a moderate temperature, preferably below 70° C., with a dilute mineral acid solution, such as aqueous sulphuric or nitric acid, to effect hydrolysis, evaporating the hydrolysis mixtures under vacuum and preferably at temperatures below 70° C. to concentrate the product, and crystallizing malonic acid from the concentrated mixture. Although malonic acid of high purity may be obtained in this way, the yield is usually low (due presumably to incomplete crystallization of the product from the hydrolysis mixture) and the long period of time required for the hydrolysis and for evaporation of the mixture at such low temperature and the care with which the temperature must be controlled in order to avoid decomposition of the product, render this method poorly suited to commercial practice.

It is an object of this invention to provide a method whereby malonic acid of high purity may be produced from a malonic acid di-ester in shorter time, in higher yield, and more economically than has heretofore been possible. Particular objects of the invention are to provide a method whereby the time required for hydrolysis of the ester may be reduced, whereby the crystalline malonic acid product may be recovered in high yield from the hydrolysis mixture, and whereby the mineral acid employed as a catalyst for the hydrolysis may be conserved. Other objects will be apparent from the following description of the invention.

We have found that in hydrolyzing a malonic acid di-ester by heating the same with a dilute aqueous mineral acid solution, there is a prolonged induction period during which little or no hydrolysis occurs and that this induction period represents a considerable part of the total time required for the hydrolysis. We have further found that this induction period may be reduced greatly, or be eliminated, by initially adding malonic acid and/or a malonic acid monoester to the hydrolysis mixture. For instance, in one of two comparative experiments on the hydrolysis of diethyl malonate by heating the latter at 70° C. with a dilute aqueous sulphuric acid solution, it was found that 18 hours of heating was required before an appreciable amount of malonic acid was formed and that the total time required to complete the hydrolysis was approximately 60 hours. The other experiment was carried out similarly, except that approximately 0.5 mole of malonic acid per mole of the diethyl malonate was initially added to the mixture. In this second experiment, an appreciable amount of malonic acid was formed after only 6 hours of heating and the total time required for the hydrolysis was only 49 hours. The yields of malonic acid formed from diethyl malonate in the two experiments were nearly the same, but the yield of malonic acid recovered in crystalline form was much higher in the second experiment than in the first.

We have further found that although it is difficult, and probably impossible, to crystallize completely and recover all of the malonic acid product from the hydrolysis mixture, the mother liquor remaining after the crystallization may satisfactorily be admixed with a further quantity of the malonic acid di-ester, in which case it provides the inorganic acid and the malonic acid and/or malonic acid mono-ester required to accelerate the rate at which the di-ester may be hydrolyzed. We also have found that the time required for the hydrolysis may be further shortened by distilling alcohol from the reaction mixture as it is formed.

Malonic acid is prepared according to the invention by heating an aqueous mixture of a malonic acid di-ester, a hydrolysis catalyst, and malonic acid and/or a malonic acid mono-ester to a temperature sufficient for fairly rapid hydrolysis of the di-ester, but below that at which malonic acid itself is appreciably decomposed. Although any di-ester of malonic acid may be used as a starting material, di-alkyl malonates, particularly those containing less than 4 carbon atoms in each alkyl radical are usually employed, and diethyl malonate is preferred. Examples of other di-esters which may be used as starting materials are dimethyl malonate, dipropyl malonate, diisopropyl malonate, dibutyl malonate, diphenyl malonate, ditolyl malonate, dibenzyl malonate, etc.

As the hydrolysis catalyst, a strong acid such as sulphuric acid, nitric acid, hydrochloric acid, benzene sulphonic acid, or naphthalene sulphonic acid, etc., or a salt such as titanium chloride, zinc chloride, aluminum chloride, or stannic chloride, etc., which is readily hydrolyzed by water to form an acid is employed. For convenience, such catalysts are herein referred to as "acid-acting hydrolysis catalysts." Sulphuric acid of a sulphonic acid is preferably used to catalyze the hydrolysis. Only a small proportion of the catalyst, e. g., between 0.01 and 0.05 chemical equivalent per mole of the malonic acid di-ester, is required in the hydrolysis, but the catalyst may of course be used in larger proportions.

The reaction mixture may contain water in any amount above that required by the reaction, but the proportion of water is preferably restricted so as to avoid the necessity of evaporating a large volume of water in order to crystallize the malonic acid product. Usually between 5 and 20 molecular equivalents of water is used per mole of the malonic acid di-ester.

Malonic acid or a malonic acid mono-ester (preferably of an aliphatic alcohol containing less than 4 carbon atoms) is added prior to, or during the early stages of, the hydrolysis reaction in amount corresponding to at least 0.15, and preferably between 0.2 and 0.5, of the molecular equivalent of the di-ester to be hydrolyzed. As hereinbefore mentioned, both the hydrolysis catalyst and the malonic acid and/or malonic acid mono-ester required to promote the rate of hydrolysis are preferably provided by admixing with the malonic acid di-ester, the mother liquor remaining after crystallization of the major portion of the malonic acid product from the reaction mixture obtained in a preceding reaction for the hydrolysis of the di-ester.

In order to avoid excessive decomposition of the malonic acid the mixture is heated at temperatures below 100° C. and preferably between 50° and 70° C. both during the hydrolysis reaction and during evaporation of the hydrolysis mixture to crystallize the malonic acid product therefrom. The hydrolysis reaction may be furthered by continuously or periodically distilling from the mixture the alcohol formed by the reaction, which distillation is in most instances carried out under vacuum. In practice, the hydrolysis is advantageously carried out under vacuum, using between 5 and 10 moles of water per mole of the di-ester reactant so as to distill alcohol from the mixture as it is formed. During such operation, water may be added at a rate corresponding approximately to that at which water is consumed by the reaction, e. g., one molecular equivalent of water may be added for each mole of alcohol distilled from the mixture. In hydrolyzing di-ethyl malonate as just described, the ethyl alcohol may be distilled from the reaction mixture in a concentration of from 80 to 95 per cent by volume. This alcohol may, of course, be used for the preparation of additional diethyl malonate.

The time of heating required for the hydrolysis is dependent upon a number of factors such as the particular malonic acid di-ester to be hydrolyzed, the kind and proportion of hydrolysis catalyst employed, the proportion of malonic acid initially added to the mixture, the quantity of di-ester to be hydrolyzed, etc., and cannot definitely be stated. However, the hydrolysis of diethyl malonate may be carried out under the preferred conditions just described in from 5 to 30 hours. In all instances, the time required for the hydrolysis is greatly reduced by initially adding malonic acid, or a malonic acid mono-ester, to the reaction mixture.

The hydrolysis mixture is advantageously decolorized by treatment while hot with a bleaching agent such as activated charcoal, fuller's earth, or a bleaching clay, etc., and filtered. It is then concentrated by evaporating water therefrom under vacuum at temperatures below 100° C. and usually between 40° and 70° C. This operation is usually continued until the mixture contains between 80 and 90 per cent by weight of malonic acid. The time required for the evaporation varies depending on the proportion of water to be removed and the temperature and pressure employed, but in practice is usually between 3 and 10 hours.

The concentrated solution is cooled, e. g., to room temperature or lower, to crystallize the malonic acid product. The latter is filtered or otherwise separated from the mixture, washed with a small portion of water to remove adhering mother liquor, and dried. As much as 90 per cent of the malonic acid in a hydrolysis mixture may be recovered as the substantially pure crystalline compound in a given cycle of the process, although in practice the recovery in each cycle is usually somewhat lower, e. g., between 80 and 90 per cent of theoretical.

The mother liquor remaining after the crystallization contains the hydrolysis catalyst, a considerable amount of malonic acid, and probably some malonic acid mono-ester. This mother liquor and a small portion of water are admixed with a further quantity of the malonic acid di-ester, and the mixture is heated as hereinbefore described to hydrolyze the di-ester and produce additional malonic acid. Thus the hydrolysis catalyst may be recycled repeatedly in the process and in being recycled, it carries with it sufficient dissolved malonic acid to reduce greatly the hydrolysis period in each cycle of the process.

The process may be practiced in the cyclic batch-wise manner just described, or continuously, as desired. When operating in continuous manner, a mixture of the malonic acid di-ester, water, the hydrolysis catalyst and either malonic acid or a malonic acid mono-ester is passed in continuous flow, first through a reaction zone where it is heated to the hydrolyzing temperature under vacuum while distilling off alcohol as formed, thence to a concentrating zone where a portion of the water is evaporated from the mixture under vacuum, then through a cooling zone and to a crystallizing chamber, where the malonic acid product is caused to crystallize. The crystalline product is removed by filtration and the mother liquor, which contains the hylrolysis catalyst and dissolved malonic acid, is continuously fed back into the reaction zone together with freshly added malonic acid di-ester and a small portion of water. Once such continuous process is in operation so that the amount of malonic acid being recycled is substantially constant the yield of crystalline malonic acid product is usually 85 per cent of theoretical or higher, based on the amount of malonic acid di-ester being fed into the system.

The following examples describe comparative experiments which illustrate certain of the advantages of the invention but are not to be construed as limiting its scope. It may be mentioned that Example 1 illustrates practice in accordance with the invention, whereas Example 2 describes a hydrolysis of diethyl malonate under conditions outside of the scope of the invention. The principal difference in procedure between the examples is that in Example 1 diethyl malonate is hydrolyzed in the presence of initially added malonic acid, whereas in Example 2 no malonic acid is added as such. The examples show that such initial addition of malonic acid to the hydrolysis mixture reduces greatly the time required for the hydrolysis reaction and also improves the yield of malonic acid recoverable in crystalline form.

*Example 1*

A mixture was prepared of 320 pounds (2 moles) of diethyl malonate, 315 pounds (17.5 moles) of water and 93 pounds of a mother liquor which remained after crystallizing the major portion of the malonic acid product from the reaction mixtures obtained in prior experiments on the hydrolysis of diethyl malonate. Said mother liquor contained approximately 0.035 pound mole of sulphuric acid and 0.464 pound mole of malonic acid, the remainder being largely water together with a small amount of monoethyl malonate. The mixture was heated under total reflux at a temperature of 70° C. and a pressure of 175 millimeters absolute in a vessel fitted with a distilling column. As the heating was continued, alcohol was formed and, as a consequence, the temperature of the vapors in the upper portion of the column became lower and finally was only 46° C. Ethyl alcohol was then distilled from the mixture until the temperature had increased, e. g., to about 48° C., at which time heating of the residual mixture under total reflux was resumed. These operations of heating the reaction mixture under vacuum at about 70° C. and of periodically distilling off the accumulated alcohol were continued until 25.7 gallons of distillate, containing approximately 3.2 pound moles of ethyl alcohol and 0.038 pound mole of diethyl malonate, had been collected. The quantity of alcohol was such as to indicate that at least 80 per cent of the diethyl malonate had been hydrolyzed. The time of heating required for the hydrolysis was 47 hours. The hydrolysis mixture was decolorized by treatment while hot with activated charcoal and filtering. Heating of the filtrate at approximately the temperature and pressure above stated was resumed for the purpose of evaporating part of the water and thus concentrating the malonic acid product. The evaporation, which required 4.5 hours of heating, was discontinued when the residual mixture contained approximately 85 per cent by weight of malonic acid. The mixture was cooled to 26° C. to crystallize the major part of the malonic acid and the crystalline product was separated by filtration, washed free of mother liquor with a small portion, e. g., about 5 per cent by weight, of water and dried. There was obtained 185.5 pounds (1.75 moles) of substantially pure crystalline malonic acid. The mother liquor from which the product was crystallized contained the sulphuric acid initially employed and approximately 30.2 pounds (0.284 mole) of dissolved malonic acid and 0.037 pound mole of unreacted diethyl malonate. It is suitable for re-employment as an agent in hydrolyzing other batches of diethyl malonate. The yield of the crystalline malonic acid product was 81.6 per cent of theoretical, based on the diethyl malonate consumed. The total time of heating required for the hydrolysis and for evaporation of the reacted mixture was 51.5 hours.

*Example 2*

A mixture of 320 pounds (2 moles) of diethyl malonate, 308 pounds (17.1 moles) of water and 3.6 pounds (0.035 mole) of sulphuric acid was heated under total reflux at a temperature of 70° C. and at 175 millimeters absolute pressure in a vessel provided with a distilling column. During heating the temperature of the vapors at the top of the column became lower due to the formation of ethyl alcohol in the mixture and the accumulated alcohol was periodically withdrawn as distillate while continuing heating of the residual reaction mixture at the temperature and pressure stated above. There was collected 26 gallons of distillate containing 3.3 pound moles of ethyl alcohol and 0.018 pound mole of diethyl malonate. The quantity of alcohol collected in the distillate indicated that at least 82.4 per cent of the diethyl malonate had been hydrolyzed. The time of heating required to complete the hydrolysis to this point was 59.5 hours. The hydrolysis mixture was decolorized by treatment with activated charcoal and filtered while hot. Heating of the filtrate at approximately the temperature and pressure above stated was resumed for purpose of evaporating water therefrom and concentrating the malonic acid product. The evaporation which required 5 hours of heating, was discontinued when the residual mixture contained approximately 85 per cent by weight of malonic acid. The mixture was then cooled to 16° C. to crystallize the malonic acid product which was separated by filtration, washed with about 5 per cent of its weight of water, and dried. There was obtained 123 pounds (1.16 moles) of substantially pure crystalline malonic acid. The mother liquor from which the product was crystallized contained the sulphuric acid catalyst, approximately 0.443 pound mole of dissolved malonic acid, and 0.03 pound mole of diethyl malonate. The yield of crystalline malonic acid was 59.5 per cent of theoretical based on the diethyl malonate consumed and the yield of malonic acid formed, but not all recovered in crystalline form, was 81.8 per cent of theoretical on the same basis. The total time of heating required for the hydrolysis and for evaporation of the mixture to crystallize the product was 64.5 hours.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method wherein malonic acid is prepared by hydrolyzing a malonic acid di-ester in the presence of an acid-acting hydrolysis catalyst, the step of carrying the hydrolysis out in the presence of an added agent selected from the class consisting of malonic acid and lower monoalkyl esters of malonic acid.

2. In a method wherein malonic acid is prepared by hydrolyzing a malonic acid di-ester in the presence of an acid-acting hydrolysis catalyst, the step of carrying out the reaction in the presence of added malonic acid.

3. In a method wherein malonic acid is prepared by hydrolyzing a malonic acid dialkyl ester in the presence of an acid-acting hydrolysis catalyst, the steps of initially adding to the reaction mixture an agent selected from the class consisting of malonic acid and lower mono-alkyl esters of malonic acid in amount corresponding to between 0.2 and 0.5 of a molecular equivalent of the dialkyl malonate, heating the reaction mixture to a reaction temperature below 100° C. in such manner as to distill alcohol from the mixture as it is formed, continuing heating of the mixture at below 100° C. and at subatmospheric pressure to evaporate water therefrom and concentrate the malonic acid product and thereafter crystallizing the malonic acid from the mixture and separating the crystalline product.

4. A cyclic method for the preparation of malonic acid by hydrolysis of a di-ester of malonic acid which comprises heating an aqueous mixture of the malonic acid di-ester, an acid-acting hydrolysis catalyst and an added agent selected from the class consisting of malonic acid and lower mono-alkyl esters of malonic acid to a reaction temperature between 50 and 70° C. at sub-atmospheric pressure in such manner as to distill from the mixture alcohol formed by the hydrolysis, thereafter continuing heating of the mixture at sub-atmospheric pressure and at temperatures between 40 and 70° C. to distill water therefrom and concentrate the malonic acid product, cooling the mixture to crystallize malonic acid therefrom and removing the crystalline product, admixing the motor liquor from the crystallization, which motor liquor comprises the acid-acting hydrolysis catalyst and dissolved malonic acid, with further quantities of water and the malonic acid di-ester, and hydrolyzing the latter by heating the resultant mixture under the reaction conditions above specified.

5. A cyclic method for the preparation of malonic acid by the hydrolysis of diethyl malonate which comprises heating an aqueous mixture of diethyl malonate, sulphuric acid and added malonic acid to a reaction temperature between 50 and 70° C. at sub-atmospheric pressure in such manner as to distill from the mixture ethyl alcohol formed by the hydrolysis, thereafter evaporating water from the mixture by continuing heating of the latter at a temperature below 70° C. and at sub-atmospheric pressure until the residual mixture contains between about 70 and about 90 per cent of malonic acid, cooling the mixture to crystallize malonic acid therefrom, removing the crystalline product, and admixing the mother liquor, which contains the sulphuric acid and dissolved malonic acid, with further amounts of water and diethyl malonate and hydrolyzing the latter by heating the resultant mixture under the reaction conditions above specified.

EDGAR C. BRITTON.
EZRA MONROE.